(12) United States Patent
Frankenstein et al.

(10) Patent No.: US 8,784,076 B2
(45) Date of Patent: Jul. 22, 2014

(54) DISK SPRING FOR A TURBOCHARGER

(75) Inventors: Dirk Frankenstein, Worms (DE); Holger Faeth, Fussgoenheim (DE); Ralf Boening, Reiffelbach (DE)

(73) Assignee: BorgWarner Inc., Auburn Hills, MI (US)

( * ) Notice: Subject to any disclaimer, the term of this patent is extended or adjusted under 35 U.S.C. 154(b) by 754 days.

(21) Appl. No.: 12/282,847

(22) PCT Filed: Mar. 13, 2007

(86) PCT No.: PCT/EP2007/002210
§ 371 (c)(1),
(2), (4) Date: Sep. 12, 2008

(87) PCT Pub. No.: WO2007/104535
PCT Pub. Date: Sep. 20, 2007

(65) Prior Publication Data
US 2009/0060737 A1   Mar. 5, 2009

(30) Foreign Application Priority Data
Mar. 14, 2006  (DE) .......................... 10 2006 011 709

(51) Int. Cl.
*F01D 17/16* (2006.01)
(52) U.S. Cl.
USPC ........................................................ 417/373
(58) Field of Classification Search
USPC ............................ 415/177; 267/159, 161, 162
See application file for complete search history.

(56) References Cited

U.S. PATENT DOCUMENTS

| 6,068,250 | A | * | 5/2000 | Hawkins et al. | ............... 267/162 |
| 7,189,058 | B2 | * | 3/2007 | Metz et al. | ..................... 415/165 |
| 7,600,969 | B2 | * | 10/2009 | Frankenstein et al. | ........ 415/177 |
| 2005/0084388 | A1 | * | 4/2005 | Hayes et al. | ............... 417/222.1 |
| 2008/0304957 | A1 | * | 12/2008 | Walter et al. | .................. 415/159 |

FOREIGN PATENT DOCUMENTS

| DE | 3023009 A1 | 1/1982 |
| DE | 3023010 A1 | 1/1982 |
| DE | 202005009491 U1 | 8/2005 |
| EP | 0187486 A1 | 7/1986 |
| WO | 2006133793 A1 | 12/2006 |

* cited by examiner

*Primary Examiner* — Nimeshkumar Patel
*Assistant Examiner* — Jacob R Stern
(74) *Attorney, Agent, or Firm* — William G. Anderson; Stephan A. Pendorf; Patent Central LLC

(57) ABSTRACT

The invention relates to a turbocharger (1) having a cartridge (K), which is arranged in a turbine housing (2), for the variable turbine geometry, having a bearing housing (3) which is arranged between the turbine housing (2) and a compressor housing of a compressor wheel and in which is arranged a bearing arrangement for a shaft (W) which supports the turbine wheel and the compressor wheel, and having a plate spring (4) which is arranged between the cartridge (K) and the bearing housing (3), wherein the plate spring (4) is constructed from at least two material layers (5, 6) and an isolator (17).

17 Claims, 2 Drawing Sheets

DISK SPRING FOR A TURBOCHARGER

DESCRIPTION

Figure 1:
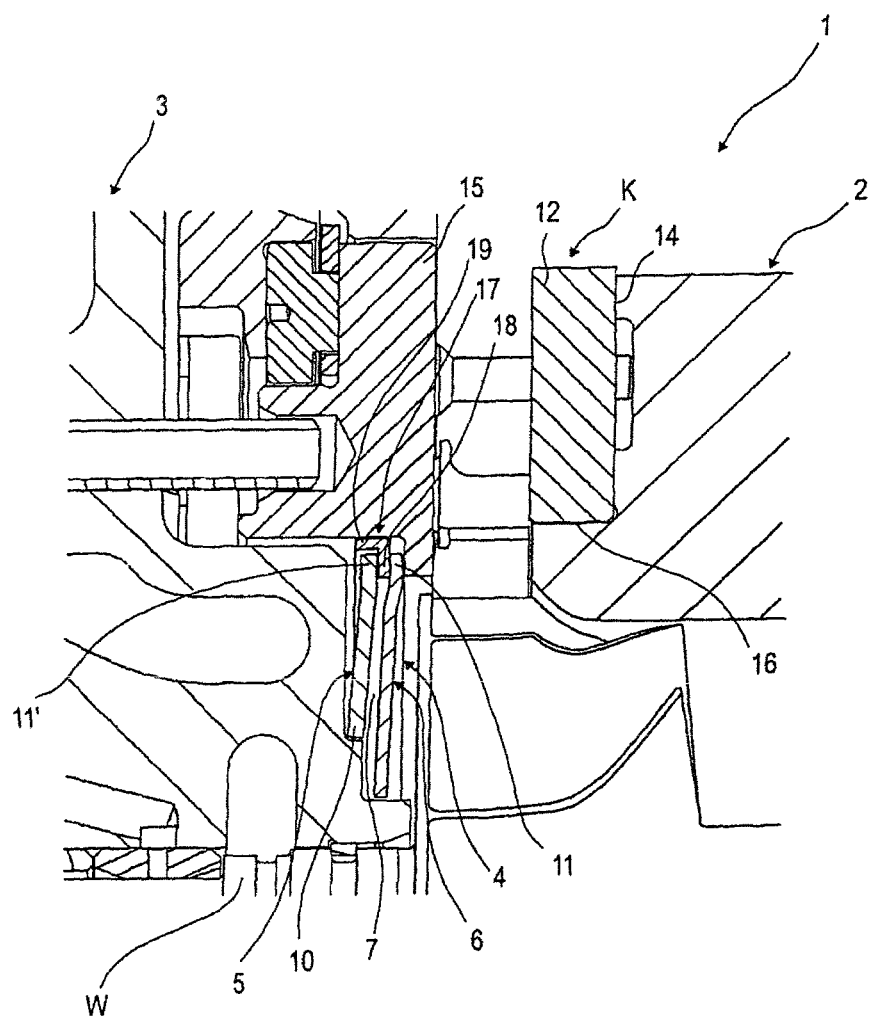

The invention relates to a turbocharger according to the preamble of claim 1. Such a turbocharger is known from WO 2004/048 755A.

A further turbocharger is known from EP 1 398 463 A1. In the case of this turbocharger a heat shield is provided around its shaft on the turbine side, which serves for protecting the bearing housing against damage as a result of excessive temperatures due to the exhaust gases of the internal combustion engine which flow through the turbine. The known heat shield comprises a single-layer component, the thermal insulating properties of which, however, are in need of improvement.

In EP 0 160 460 B1, a further arrangement is shown, wherein in this case a disk spring is used, which exerts an axial pretensioning force upon the blade bearing ring which is to be axially fixed. The function of the thermal insulation is not necessary at this point on account of the turbine wheel distances.

It is therefore the object of the present invention to create a turbocharger of the type which is disclosed in the preamble of claim 1, which for one thing ensures by means of a disk spring an axial fixing of the cartridge of the variable turbine geometry in the turbine wheel proximity, and for another thing enables an improved thermal insulation in the direction of the bearing housing.

The achieving of this object is effected by means of the features of claim 1.

According to the invention, the disk spring is constructed in conjunction with an insulator. This insulator for one thing brings about a lower component temperature of the disk spring, and therefore a higher pressing-on force, and for another thing brings about a lower heat yield into the adjacent components (bearing housings). The combination consisting of a thermal protection layer, insulator and disk spring layer can be effected either in a materially-bonding or form-fitting manner, or the individual components can be installed separately during the turbocharger assembly. The insulator can be designed so that it shields the hot cartridge components in relation to the bearing housing.

The disk spring of the turbocharger according to the invention is formed from at least two, but if necessary a plurality of material layers, and includes both the function of creating a pretensioning force and the further improvement of the shielding function by increasing the thermal resistance. As a result, it is possible to safeguard the function, particularly even in the case of increased exhaust gas temperatures.

In addition, liquid cooling of the bearing housing can possibly advantageously be dispensed with.

The dependent claims have advantageous developments of the invention as subject matter.

In claim 11, a disk spring for a turbocharger according to the invention is defined as an independently marketable object.

Figure 2:
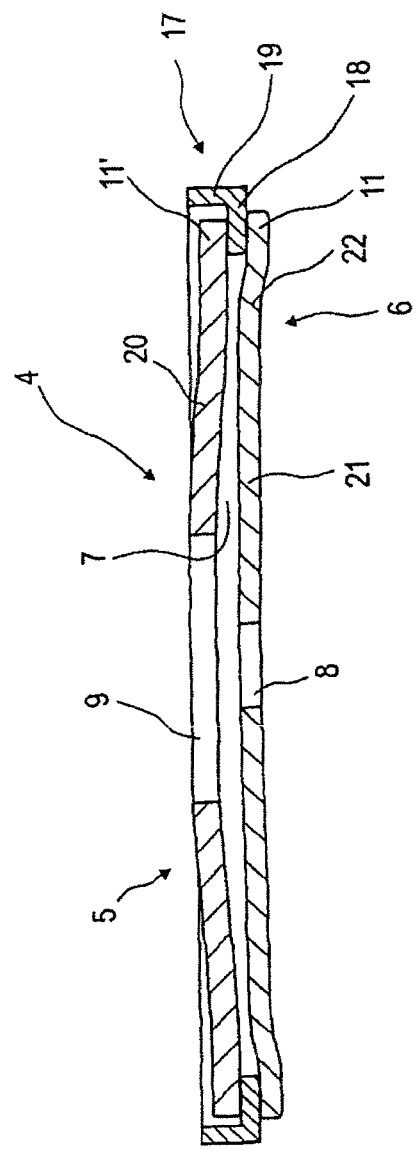

Further details, advantages and features of the present invention result from the subsequent description with reference to the drawing. In the drawing:

FIG. 1 shows a part of a turbocharger according to the invention with a disk spring according to the invention, FIG. 2 shows a sectional view of an embodiment of the disk spring according to the invention.

In FIG. 1, a section of a turbocharger 1 according to the invention is shown, since this view is sufficient for the explanation of the principles according to the invention. Naturally, the turbocharger 1 has all the construction elements which are customarily provided, which, as mentioned, are omitted, however, in FIG. 1 for simplifying the view.

Therefore, in FIG. 1 a turbine casing 2 of a turbine is shown, which is arranged adjacent to a bearing housing 3. This bearing housing 3 is arranged between the turbine casing 2 and a compressor casing (not shown) of a compressor wheel which is also not shown. The bearing housing 3 has the bearing for a shaft, which is symbolized in FIG. 1 by means of the designation W, since FIG. 1 reproduces only the upper section of the turbocharger 1 according to the invention.

The shaft W supports the turbine and the compressor wheel and is mounted in the bearing housing 3 via a suitable bearing arrangement.

A disk spring 4 according to the invention, which is formed with a multiplicity of layers, is clamped between the bearing housing 3 and a cartridge K which is formed by a VTG disk 12 with axial stop 14 and a blade bearing ring 15 and which is axially movably arranged in the turbine casing 2. In the case of the example, two material layers 5 and 6 are provided here, which are subsequently explained in more detail with reference to FIG. 2.

FIG. 1 illustrates the arrangement of the disk spring 4 between the turbine casing 2 and the bearing housing 3, wherein the material layer 5 has a radially inner locating region 10 and a radially outer locating region 11' which is oriented parallel to a locating region 11 of the material layer 6. An insulator 17 is clamped by a clamping region 18 between the material layers 5 and 6 or their locating regions 11 and 11'. The radially outer edge of the insulator 17 is angled by about 90° and as a result forms a support region 19 which supports the insulator 17 radially on the cartridge K. Consequently, the heat which emanates from the cartridge K is effectively insulated in relation to the bearing housing 3.

In FIG. 2, the disk spring 4 according to the invention is shown in its entirety. The two material layers 5 and 6 in the case of this embodiment are separate parts which lie one upon the other in a sandwich-like manner with the inclusion of the clamping region 18 of the insulator 17. FIG. 2 illustrates that the material layer 5 has a center recess 9 which is arranged coaxially to a center recess 8 of the material layer 6, and has a larger diameter. An air gap 7, which further improves the thermal insulating properties, is provided between the material layers 5 and 6. In addition, FIG. 2 shows that the material layer 5 has a main section 20 adjacent to the center recess 9, which is arranged at an obtuse angle to the locating region 11'. The material layer 6 also has a main section 21 adjacent to the center recess 8, which is connected in one piece via an angled intermediate region 22 to the bearing region.

In addition to the written description and for supplementing the disclosure, the illustration of the invention in FIGS. 1 and 2 is explicitly referred to.

LIST OF DESIGNATIONS

1 Turbocharger/exhaust gas turbocharger
2 Turbine casing
3 Bearing housing
4 Disk spring
5, 6 Material layers
   (5: disk spring layer (disk spring) for pretensioning;
   6: thermal protection layer (heat shield) for layer 5)
7 Air gap
8, 9 Center recesses
10, 11, 11' Locating regions
12 VTG disk
13 —
14 Axial stop 15 Blade bearing ring
16 Centering of the cartridge K on the turbine casing 2
17 Insulator
18 Clamping region
19 Support region
20 Main section of 5, angled to 11'
21 Main section of 6, connected via angled intermediate region 22 to 11
22 Intermediate region
W Shaft
K Cartridge of the variable turbine geometry (VTG)

The invention claimed is:

1. A turbocharger (1) comprising:
    a turbine casing (2) of a turbine wheel;
    a variable turbine geometry cartridge (K) arranged in the turbine casing (2);
    a bearing housing (3) arranged between the turbine casing (2) and a compressor casing of a compressor wheel, and in which is arranged a bearing arrangement for a shaft (W) which supports the turbine wheel and the compressor wheel;
    a disk spring (4) arranged between the cartridge (K) and the bearing housing (3), the disk spring (4) including at least two material layers (5, 6), one material layer (6) being a thermal protection layer for the other material layer (5), the other material layer (5) being a disk spring layer (5); and
    an insulator (17) including a solid thermal insulating structure, a first portion of the insulator (17) being arranged between the material layers (5, 6) and a second portion of the insulator (17) extending beyond a radially outer end of at least one of the material layers (5,6).

2. The turbocharger as claimed in claim 1, wherein the insulator (17) is formed with a cup-like shape.

3. The turbocharger as claimed in claim 1, wherein the first portion of the insulator (17) includes a clamping region (18) arranged between radially outer locating regions (11, 11') of the material layers (5,6).

4. The turbocharger as claimed in claim 3, wherein the locating regions (11, 11') are arranged parallel to each other.

5. A turbocharger (1) comprising:
    a turbine casing (2) of a turbine wheel;
    a variable turbine geometry cartridge (K) arranged in the turbine casing (2);
    a bearing housing (3) arranged between the turbine casing (2) and a compressor casing of a compressor wheel, and in which is arranged a bearing arrangement for a shaft (W) which supports the turbine wheel and the compressor wheel;
    a disk spring (4) arranged between the cartridge (K) and the bearing housing (3), the disk spring (4) including at least two material layers (5,6), one material layer (6) being a thermal protection layer for the other material layer (5), the other material layer (5) being a disk spring layer (5); and
    an insulator (17) including a solid thermal insulating structure, the insulator including a clamping region (18) arranged between radially outer locating regions (11, 11') of the material layers (5,6), the insulator (17) further including a support region (19) arranged at an angle of about 90° to the clamping region (18).

6. The turbocharger as claimed in claim 1, wherein an air gap (7) is arranged between the material layers (5, 6).

7. The turbocharger as claimed in claim 1, wherein the material layer (5) axially fixes the cartridge (K) on the turbine casing (2).

8. The turbocharger as claimed in claim 1, wherein the material layers (5, 6) and the insulator (17) are interconnected in one piece.

9. The turbocharger as claimed in claim 1, wherein the material layers (5, 6) and the insulator (17) are separate components.

10. The turbocharger as claimed in claim 1, wherein the material layers (5, 6) and the insulator (17) consist of the same or of different material.

11. A disk spring (4) for a turbocharger (1) comprising:
    at least two material layers (5,6) one material layer (6) being a thermal protection layer for the other material layer (5), the other material layer (5) being a disk spring layer (5); and
    an insulator (17) including a solid thermal insulating structure is arranged between the material layers (5,6), the insulator (17) including a clamping region (18) arranged between radially outer locating regions (11, 11') of the material layers (5,6), and the insulator (17) further including a portion that extends beyond a radially outer end of a least one of the material layers (5,6).

12. The turbocharger as claimed in claim 1, wherein the first portion is angled relative to the second portion.

13. The turbocharger as claimed in claim 12, wherein the first portion is angled at about 90 degrees relative to the second portion.

14. The turbocharger as claimed in claim 1, wherein the second portion substantially surrounds at least one of the material layers.

15. The disk spring for a turbocharger as claimed in claim 11, wherein the clamping region is angled relative to the portion that extends beyond a radially outer end of a least one of the material layers.

16. The disk spring for a turbocharger as claimed in claim 15, wherein the clamping region is angled at about 90 degrees relative to the portion that extends beyond a radially outer end of at least one of the material layers.

17. The turbocharger as claimed in claim 11, wherein the portion that extends beyond a radially outer end of at least one of the material layers substantially surrounds at least one of the material layers.

* * * * *